Feb. 15, 1927.

A. VANDERVELD 1,617,881

YARD INDICATOR FOR MEASURING MACHINES

Filed April 3, 1922    2 Sheets-Sheet 1

Inventor
Anthony Vanderveld.
By Frank E. Liverance, Jr.
Attorney.

Feb. 15, 1927.

A. VANDERVELD 1,617,881

YARD INDICATOR FOR MEASURING MACHINES

Filed April 3, 1922   2 Sheets-Sheet 2

Inventor
Anthony Vanderveld
By Frank E. Liverance, Jr.
Attorney.

Patented Feb. 15, 1927.

1,617,881

UNITED STATES PATENT OFFICE.

ANTHONY VANDERVELD, OF GRAND RAPIDS, MICHIGAN.

YARD INDICATOR FOR MEASURING MACHINES.

Application filed April 3, 1922. Serial No. 549,149.

This invention relates to indicator constructions for measuring machines. In practice, the same is used in connection with a combined measuring and computing machine, the invention, however, being directed to the indicating portion of the measuring mechanism and bearing no relation in its specific sense to the computing mechanism over that of any other more or less equivalent type of indicating means. In the measuring machine, it is designed that cloth or like material shall be passed lengthwise through the machine between rollers, driving one of the same by frictional contact therewith, which roller is connected with and drives the indicator portion of the mechanism. One part of the indicator mechanism continuously moves and shows either the inches or fractions of a unit of measurement through a display opening for the same, said part making one complete revolution for each unit length of goods passed through between the rollers. As each unit length or yard is passed, such part comes again to zero and starts over again for the succeeding yard to indicate the inches or fractional parts thereof passed during and in synchronism with the passage.

It is obviously necessary that an indication of the number of yards passed shall also appear, and the present invention is primarily directed to this end, in the provision of a very simple yet effective yard wheel or roller carrying consecutive number indications thereon, together with the provision of a very simple and effective means for moving said yard wheel one step with each rotation of the inches or fractions wheel, said movement of the yard indicating wheel being accomplished substantially at the end of each complete rotation of the inches or fractions wheel. My invention accomplishes this end in a very effective and practical manner, and as ancillary thereto, includes many novel constructions and arrangements of parts, all of which will appear as understanding of the invention is had from the following description, taken in connection with the accompanying drawings, in which, Fig. 1 is a partial side elevational and vertical sectional view of a measuring machine made in accordance with my invention.

Figure 2:
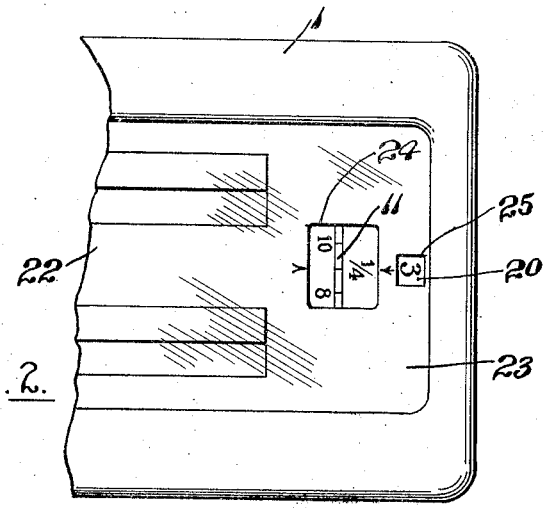

Fig. 2 is a fragmentary plan view thereof, the front end portion of the machine being shown.

Figure 1:
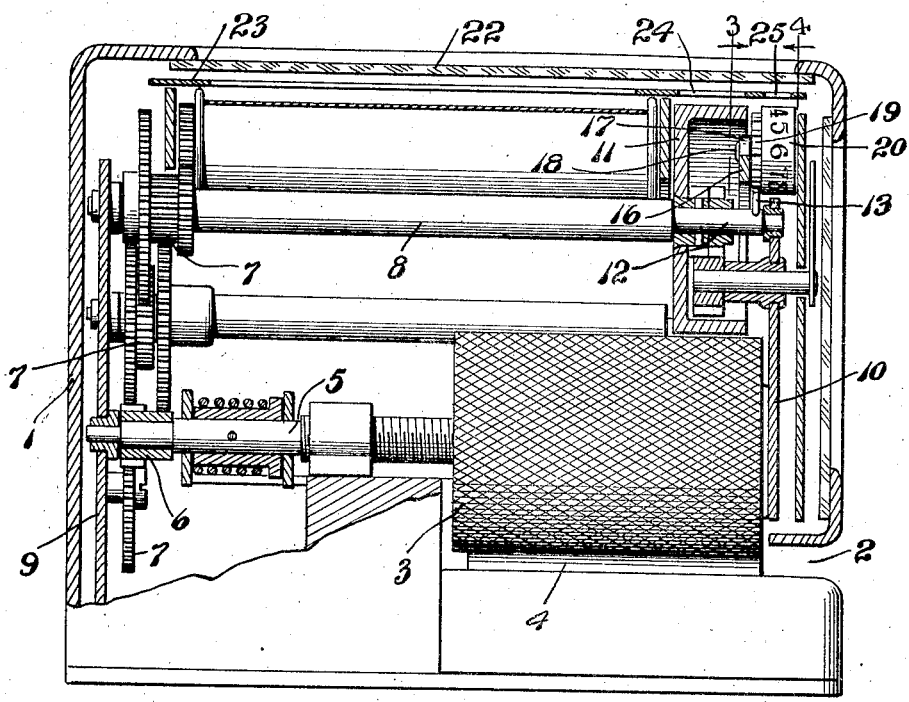
Figure 3:
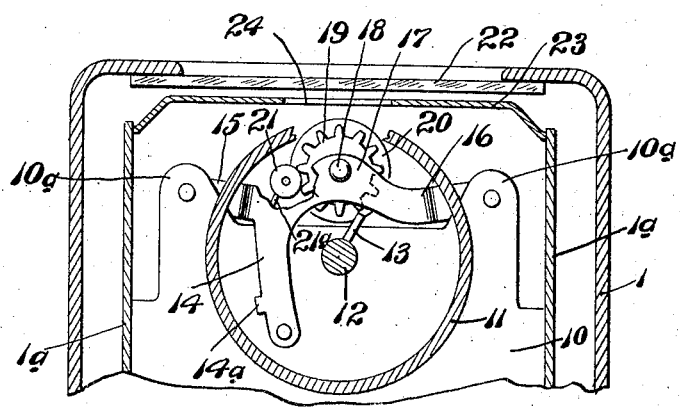
Figure 4:
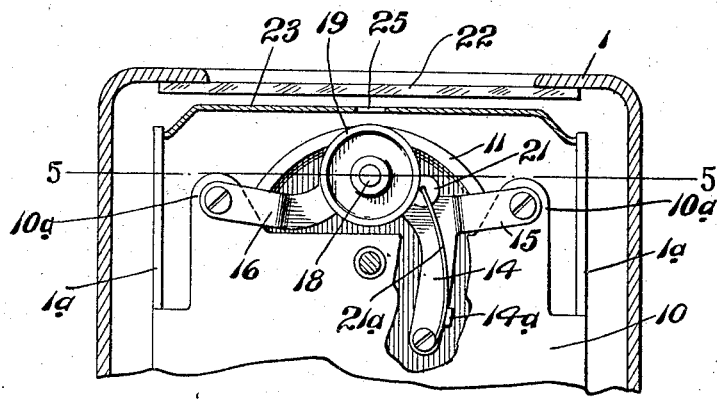
Figure 5:
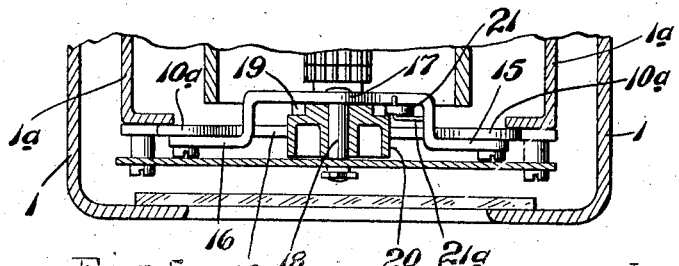

Figs. 3 and 4 are transverse vertical sections, taken on the planes of lines 3 and 4, of Fig. 1 and looking in the directions indicated by the arrows, and Fig. 5 is a fragmentary horizontal section taken on the plane of line 5—5, of Fig. 4.

Like reference characters refer to like parts in the different figures of the drawings.

The measuring machine mechanism is housed within a casing 1, in the front end of which near its lower side a horizontal slot is made for the entrance of an edge of the cloth, ribbon or the like to be measured, for its passage between the two rollers 3 and 4, the former of which may be termed the measuring roller and the latter the presser roller, serving to press the goods against the measuring roller. Said measuring roller 3 is fixed to a shaft 5, at the rear end of which a pinion 6 is fixed, the same driving a train of gearing, indicated at 7 for driving a shaft 8 located parallel to and above shaft 5. The shafts, gearing and other parts of the measuring machine mechanism are supported by a frame within the casing 1 comprising rear and front plates 9 and 10 and two side plates 1ª, said plates paralleling the sides and ends of the casing 1. Shaft 8, near its front end has a reduced extension 12 on which a wheel or drum 11 is secured to turn with the shaft. The size of the roller 3 and ratio of the gearing is such that whenever a yard length of goods has been drawn between the rollers 3 and 4 to drive the measuring roller, shaft 8 makes one complete and exact revolution. Drum 11 necessarily makes one complete revolution likewise. It will be noted (see Fig. 2) that the drum 11 carries indicating characters thereon in consecutive order, having reference to inches of goods passed, and that it also has fractional characters thereon showing the fractional part of a yard passed at any time between complete revolutions of the drum or wheel 11, the machine being available for the measurement of goods either in inches or fractions of a yard. Near the front end of the extension 12 to shaft 8 a pin 13 is secured, projecting radially therefrom (see Figs. 1 and 3).

An irregularly shaped supporting bracket having arms 14, 15 and 16, the latter two of which extend in opposite directions, while the arm 14 extends downwardly from a point between the ends thereof, is secured to the front plate 10 by means of screws or equivalent fastenings. Arms 15 and 16 lie in front of plate 10 and are connected at their ends to upwardly extending ears 10a thereof. The intermediate portion of the bracket is rearwardly off-set to lie back of the plate 10 and arm 14 depending therefrom lies back of the plate. This intermediate portion has a raised section 17 to which a pin 18 is permanently secured, the same extending horizontally forward, as best shown in Fig. 5. On this pin a combined pinion 19 and yards indicating wheel 20 is mounted for free rotation, being located directly in front of the inches and fractions wheel or drum 11, their upper surfaces being in the same plane substantially. The pinion 19 has a number of teeth corresponding with the limit of the number of yards the machine is designed to measure at one time, and said pinion is located in the same vertical plane with the pin 13, so that with each revolution of shaft 8, the pin 13 engages with the pinion temporarily and turns it one step. On its outer curved surface the yards wheel 19 carries a consecutive number series from zero to the number of yards marking the capacity of the machine to measure at one time, being spaced apart equal distances and movable successively into view with the step by step partial turning of the pinion 19 by pin 13.

A small roller 21 is rotatably carried at the upper end of a spring rod 21a, mounted at its lower end on the connection by means of which the arm 14 is attached to plate 10. The spring bears between its ends against a lip 14a turned from arm 14. The roller 21 is held yieldingly against the pinion 19 between any two consecutive teeth thereof, normally holding the pinion from rotation, but yielding to permit such rotation when the pin 13 engages with the pinion, immediately engaging between the succeeding two consecutive teeth after the partial step rotation has taken place.

The upper side of the casing 1 has an opening therein covered and closed by a section of glass 22. Under the glass a sheet metal plate 23 is located horizontally, being carried on the frame plates 1a. The sheet metal plate 23 has two openings 24 and 25 cut therethrough, the former over the drum 11 and the latter over the yards indicating wheel or roller 20, said openings being for the disclosure of one only of the characters on the yards wheel, and of but a very few of the indicating characters on the inches and fractions drum, as shown in Fig. 2.

This construction of indicator for measuring machines is exceptionally compact, simple, durable and in every way serviceable. It has proved particularly practicable in use. The appended claims define the invention which is to be considered as including all forms of structure coming within the scope of said claims.

I claim:

1. In combination, with a measuring roller, a shaft driven thereby, a plate supporting one end of the shaft, a bracket attached to the plate comprising oppositely extending arms and a third depending arm, a roller carrying indicating characters around it rotatably mounted on the bracket, a pinion connected with the roller, a pin projecting from the shaft to engage with the pinion once with each revolution of the shaft, a spring arm attached at its lower end to the depending third arm, and a roller mounted at the upper end of said spring arm yieldingly engaging the pinion, substantially as described.

2. In combination, with a measuring roller, a shaft driven thereby, a plate supporting one end of the shaft and having a recessed upper end, a bracket attached to the plate comprising oppositely extending arms and a third depending arm, said bracket having an intermediate portion between the ends of said oppositely extending arms bent to pass through said recessed portion of the plate and said downwardly extending arm depending therefrom, a roller carrying indicating characters around it rotatably mounted on the bracket, a pinion connected to the roller, a pin projecting from the shaft to engage with the pinion once with each revolution of the shaft, and yielding means mounted on the bracket to engage with the pinion, substantially as described.

In testimony whereof I affix my signature.

ANTHONY VANDERVELD.